June 17, 1958  M. D. KRAMER  2,839,569
PURIFICATION OF OXO ALCOHOLS BY ANION EXCHANGE RESINS
Filed June 27, 1951
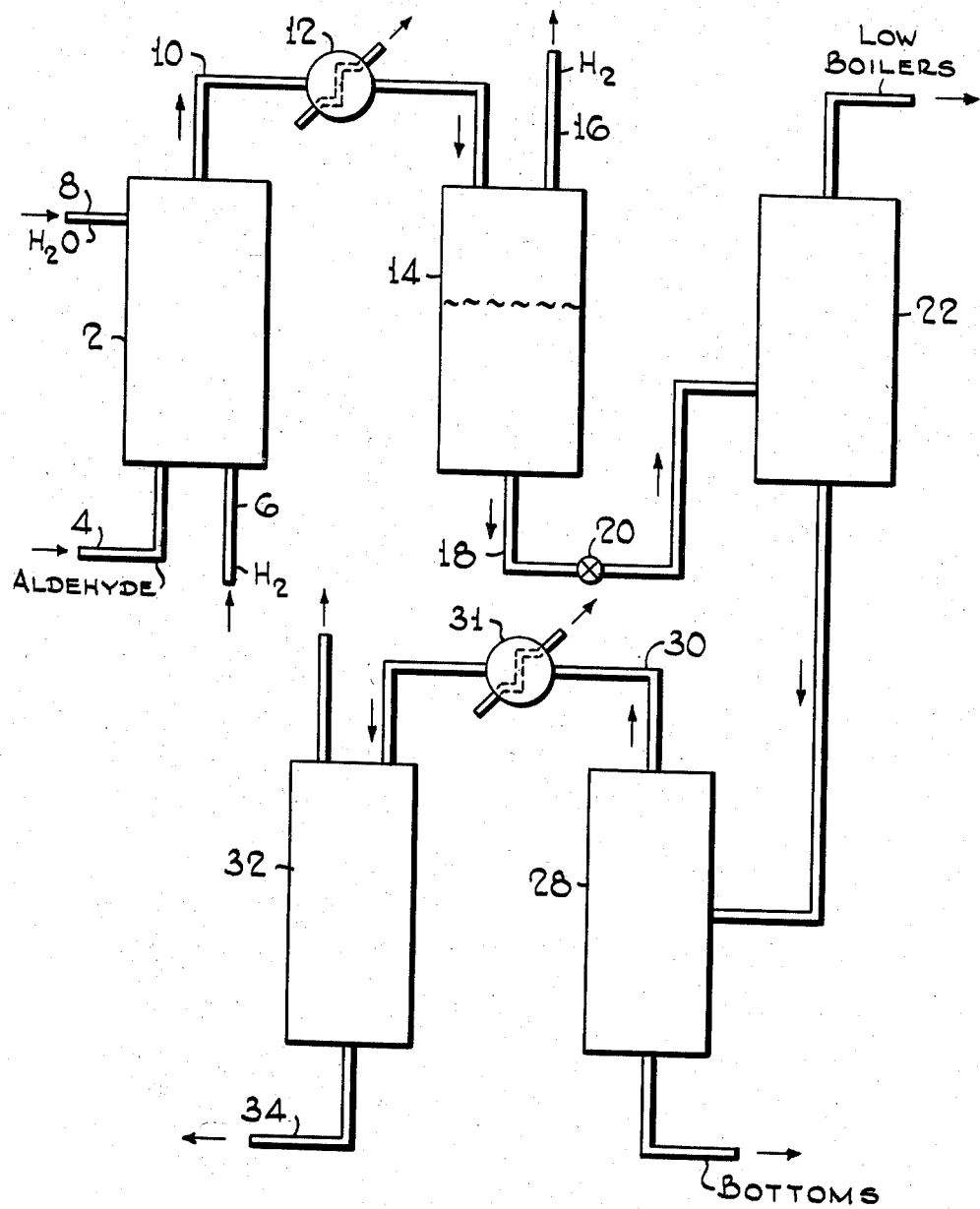
Margaret D. Kramer Inventor
By J. Cashman Attorney

United States Patent Office 2,839,569
Patented June 17, 1958

2,839,569
PURIFICATION OF OXO ALCOHOLS BY ANION EXCHANGE RESINS

Margaret D. Kramer, Baton Rouge, La., assignor to Esso Research and Engineering Company, a corporation of Delaware Application June 27, 1951, Serial No. 233,801

8 Claims. (Cl. 260—475)

The present invention relates to the preparation of oxygenated organic compounds from olefins by reacting the latter with CO and $H_2$ in the presence of carbonylation catalysts. More specifically, the present invention relates to the purification of alcohol products obtained by the hydrogenation of the aldehyde products derived from this process, particularly when said aldehyde product is hydrogenated in the presence of a sulfur-insensitive catalyst.

The synthesis of oxygenated organic compounds from olefinic compounds and mixtures of CO and $H_2$ in the presence of a catalyst containing metals of the iron group, such as cobalt or iron, preferably the former, is well known in the art. In the first stage, the olefinic material, catalyst and the proper proportions of CO and $H_2$ are reacted to give a product consisting essentially of aldehydes containing one more carbon atom than the reacted olefin. This oxygenated organic mixture, which contains dissolved in it, salts and the carbonyls and molecular complexes of the metal catalyst, is treated in a second stage to cause removal of soluble metal compounds, such as carbonyls, from the aldehyde product in a catalyst removal zone. The catalyst-free aldehyde product is then generally hydrogenated to the corresponding alcohols, and it is to the alcohol thus produced that the present invention applies.

This carbonylation reaction provides a particularly attractive method for preparing valuable primary alcohols which find large markets particularly as intermediates for plasticizers, detergents and solvents. Amenable to the reaction are long and short chain olefinic and oxygenated olefinic compounds. Thus, straight and branch chained olefins and diolefins, propylene, butylene, styrene, olefin polymers such as di- and tri-isobutylene, polypropylene fractions, olefinic fractions from thermal or catalytic cracking processes and the like, may be used as starting materials.

The catalyst in the first stage may be added as oil soluble salts of the catalytically active metal with high molecular weight fatty acids, such as oleic, stearic, naphthenic, and the like, or it may be added as a slurry of the metal or its compounds, or as the carbonyl. Inasmuch as the active catalyst is probably the hydrocarbonyl of the metal, such as cobalt hydrocarbonyl, most forms of the metal may be employed as catalyst, and these are converted into the active species in the course of the reaction.

The synthesis gas mixture fed to the first stage may consist of any ratio of $H_2/CO$, preferably the gases are present in about equal volumes. The conditions for reacting $H_2$ and CO vary somewhat in accordance with the nature of the olefin feed and catalyst form, but the reaction is generally conducted at about 2000–4500 p. s. i. g. and at temperatures in the range of about 250°–450° F. The ratio of synthesis gas to olefin feed may vary widely; in general about 2500 to 15,000 cu. ft. of $H_2$ and CO per barrel of olefin feed are employed.

Following the carbonylation stage, the aldehyde product, containing in solution a considerable amount of dissolved catalyst in the form of carbonyl and other compounds, is generally treated at elevated temperatures in the presence of a gas in vapor, such as hydrogen or steam, to decompose the carbonyl to an oil-insoluble form of cobalt or other metal, and drive off CO formed. Thereafter, the aldehyde product is freed of suspended catalyst metal or compounds, and is passed to a hydrogenation zone for conversion into alcohols.

The hydrogenation stage may be operated at conventional hydrogenation conditions including temperatures, pressures, and gas and liquid feed rates of the same order of magnitude as those obtaining in the first, or carbonylation stage. Various known types of catalyst, such as nickel, tungsten, molybdenum and their oxides or sulfides, supported or unsupported, may be used.

The liquid product from the primary hydrogenation stage is worked up by distillation to separate the desired alcohols from unconverted olefinic feed material, unhydrogenated carbonyl compounds, and hydrocarbons formed in the process. The sulfide catalysts have been found to be especially useful for carrying out this hydrogenation.

The overall carbonylation or so-called "Oxo" reaction as outlined above, provides a particularly effective method for preparing valuable primary alcohols, particularly of the $C_4$ to $C_{20}$ range, which find large markets as intermediates for detergents and plasticizers. The $C_8$ and $C_9$ Oxo alcohol products are especially preferred for use in forming esters to be used as plasticizers in light colored or colorless plastics and resins.

Serious difficulties have been encountered in the primary hydrogenation stage as a result of sulfur poisoning of certain hydrogenation catalysts, when the catalysts used are those such as elementary nickel and others which are sulfur-sensitive. The most readily available olefinic feed stocks for the oxonation reaction are selected hydrocarbon streams derived from petroleum refinery sources and these frequently have sulfur contents as high as 0.1% or even higher. Furthermore, there are a variety of other ways in which sulfur may be introduced into the alcohol product during both the oxonation and hydrogenation stages for reducing the carbonyl compounds. For instance, the fatty acids used to form the metal oxonation catalyst for the purpose of introducing the metal into the reactor as the metallic naphthenate, stearate, or oleate, will usually be found to contain small amounts of sulfur-containing compounds as contaminants, particularly when the fatty acids themselves are of petroleum origin as they frequently are. The synthesis gas used in the oxonation zone which is primarily a mixture of carbon monoxide and hydrogen also may contain sulfur impurities and, in fact, the gaseous reactants employed in both stages of the Oxo reaction usually contain at least traces of sulfur impurities.

Sulfur which is present in the crude reaction mixture containing the carbonyl compounds tends to be carried through the oxonation stage into the hydrogenation stage where it combines with the hydrogenation catalyst to diminish and even completely destroy catalyst activity unless sulfur-insensitive catalysts are used. The sulfur-sensitive hydrogenation catalysts are generally of the elementary metallic type and the deactivating effect of the sulfur on their activity requires frequent reactivation, catalyst replacement, and increased amounts of a catalyst whose cost is definitely a commercial factor and may be prohibitively high. Thus, it has been considered necessary for optimum operation in the hydrogenation step to employ a sulfur-insensitive catalyst. These sulfur-insensitive catalysts include particularly certain metallic sulfide hydrogenating catalysts, examples of such catalysts being nickel sulfide, molybdenum sulfide, tungsten sulfide, and mixtures thereof. While these catalysts have the decided advantage of avoiding the inactivation due to sulfur content of the feed stock, they also possess the disadvantage of permitting much of the sulfur to pass unchanged through the hydrogenation zone and, indeed, in many instances, as when freshly sulfided, tend to introduce additional sulfur contamination into the alcohol. Thus, the final crude alcohol may have a total sulfur content of from 30–100 p. p. m., or in some cases, even higher value.

One of the largest and most important uses developed for the synthetic alcohol products is that of producing esters suitable for plasticizers, by reaction with aliphatic, alicyclic, and aromatic acids or anhydrides, including such examples as phthalic acid, maleic acid, adipic acid, and also phthalic and maleic acid anhydrides. Certain of the synthetic alcohols prepared by the oxonation and hydrogenation reaction are known to be especially suitable for the manufacture of ester plasticizers and particularly for use in clear plastics. These include alcohols from $C_4$ to $C_{20}$ range such as the butyl alcohols, the octanols, and the nonanols.

These esters are prepared in standard type esterification equipment employing reactors made of stainless steel or other metal, or, in some cases, in glass-lined reaction vessels. In some instances, particularly when the esters were produced in reactors having metallic surfaces exposed to the reacting mixtures, the products were found to be deficient as to the standards required for plasticizers, in such characteristics as odor, color, and plasticizing qualities such as the poor weathering tendency of the resins and plastics in which such plasticizers are used. These undesirable characteristics are believed to be primarily caused by impurities present in the alcohol product and certain of them are caused particularly by the sulfur products present in the alcohol, although other materials which can affect ester color and odor include polymerized and condensed higher molecular weight impurities as well as unreduced carbonyl compounds and other non-alcoholic compounds. It has further been discovered that when sulfur compounds, especially those of the acidic type, are allowed to remain in impure alcohol or aldehyde, they act as catalysts for causing increased condensation reactions which produce acetals and other high molecular weight impurities of the undesirable type. In fact, it has been found that, in order to obtain a high grade alcohol which adequately meets all specifications, the active, color-producing sulfur content should best be reduced to a value somewhere near five parts per million, although somewhat higher total sulfur concentrations can be tolerated, the exact limit of tolerance depending upon the form in which the sulfur occurs.

In general, the sulfur in the synthetic Oxo alcohols is in the form of organically combined sulfur. Although all types of organic impurities in which the sulfur occurs have not been fully determined, it is believed that the sulfur is present in a variety of forms and that it is generally deleterious in most forms when occurring in the final alcohol. Sulfur-containing contaminants cause both odor and color problems as well as act as accelerators to give unwanted properties to the alcohols. The finished alcohol should contain a minimum of sulfur-containing compounds. It is also the best practice to remove most of the carbonyl compounds and potential carbonyl compounds to obtain alcohols which give ester plasticizers of acceptable quality. These purifications are especially necessary if the ester is manufactured in stainless steel equipment and unreacted or excess alcohol is recycled to the esterification zone. A number of types of sulfur-containing impurities are believed to be present and among those probable in an iso-octyl alcohol product prepared from a $C_7$ olefin, are iso-octyl mercaptan, iso-octyl sulfide, diethyl sulfide, diethyl disulfide, dipropyl sulfide, dipropyl disulfide, butyl sulfide, as well as the corresponding sulfinic acids, sulfonic acids, sulfoxides and sulfones.

In typical alcohol recycle esterification operations, a 1% to 20% molal excess of alcohol is used based on the quantity of phthalic anhydride used. The esterification reaction is carried to substantial completion by esterification for a sufficient time. The unreacted alcohol is then stripped off from the ester product under reduced pressure and blended with fresh alcohol for returning to the esterification zone. Thus, undesirable color and odor forming materials, including sulfur-containing impurities, have the opportunity to build up during the recycle stages to a point at which they must be purged from the system before continuing the recycling operation. This presents impurity problems which occur even though the actual reaction is carried out in corrosion-resistant or glass-lined equipment.

There are regularly used a number of modified esterification procedures. Two of the main ones which are widely used for preparation of the dioctyl phthalate ester include the high temperature method in which the one mol of phthalic anhydride is heated with approximately 2 to 2.4 mols of octyl alcohol with no catalyst present and the catalytic method employing an acid as catalyzing agent. In one such method, the ester is recovered by distilling, first, the unreacted alcohol and anhydride, then finally, if it is so desired, by distilling the ester under reduced pressure. It is preferred to use the ester without distilling it, and this can be done if the alcohol used in the esterification is of sufficient purity. Although a number of finishing techniques are used for the ester, in all cases unreacted alcohol is distilled off for recycle. The catalytic method in which benzene sulfonic acid or a similar type material is used as a catalyst may be employed to give catalytic esterification at a lower temperature. The highly purified iso-octyl alcohol products, such as those made from alcohol purified through the borate ester or prepared over a sulfur-sensitive metallic primary hydrogenation catalyst, show practically no color degradation in any method of esterification. Such refined methods of production are, however, prohibitively expensive for large scale commercial production. The ester color can be expressed in a number of ways, for instance, in terms of color absorbency of the ester at a standard wave length of light, a high value indicating a darkened, low quality ester product. The wave length used for studying the di-iso-octyl phthalate ester is 4470 A.

In order to test the effectiveness of a treatment for removing sulfur and sulfur-containing impurities from Oxo alcohol products, it has been found that accelerated esterification tests can be carried out which simulate the conditions present during large scale commercial esterifications, particularly in reactors in which the esterification mixture is exposed to metallic surfaces. One such test consists in carrying out the esterification for a suitable time and at the required temperatures in the presence of suitable metallic strips, the standard esterifications being done in glass type reactors. The strips preferably used and those which give the most reproducible results are of the stainless steel type. This test is considered to be the most rigorous and gives the most complete test of alcohol quality.

In brief, therefore, the small amounts of sulfur appearing in the alcohol product, when this is to be used for plasticizing purposes, play an important role in degrading the resulting ester and making it unfit for use; acetalization appears to be catalyzed by these small amounts, and a sulfur content of greater than about 10–15 parts per million makes the alcohol unsuitable for this purpose.

Thus, in a 100 B./D. plant operation manufacturing octyl alcohol from $C_7$ olefin and passing the intermediate aldehyde product over freshly prepared molybdenum sulfide catalyst supported on activated carbon, the first 14,000 gallons of alcohol produced analyzed for about 12 parts per million of sulfur and produced an ester color of 0.35.

Even with this extremely small amount of sulfur, the alcohol was thus unsuitable for use as a plasticizer intermediate for later esterification with phthalic anhydride. The ester color, as indicated above, is a measure of the optical density of the phthalate ester as produced under the prescribed conditions, and is affected by the presence of extremely small amounts of sulfur impurities.

It has, in the past, been a difficult and expensive process to remove the undesirable products present in the carbonylation alcohol, either directly from the latter, or from the feed stream to the carbonylation process. Thus, for example, in the production of iso-octyl alcohol by reacting a heptene fraction with CO and $H_2$ it has been attempted to recover a pure alcohol by caustic washing the crude hydrogenated product to remove acidic constituents, such as mercaptans followed by distillation to remove unreacted feed stock and by-products. Not only is this process not completely adequate in removing all the sulfur, but it has the disadvantage of introducing into the distillation zone inorganic material which tends to foul equipment. The most effective measure in the past has been careful selection or processing of feed stocks for low sulfur content, and the use of a second hydrogenation or hydrodesulfurization step, employing a very active but readily poisoned catalyst such as nickel. Aside from the added investment and catalyst loss, for nickel is not readily and inexhaustibly regeneratable, these measures severely limit the availability of suitable feed stocks for the process.

It has now been found that an alcohol substantially completely free from sulfur and having the property of imparting substantially no color to the ester product when the alcohol is later esterified may be readily obtained by percolating the alcohol product through a bed of a strongly alkaline ion exchange resin. This treatment is preferably carried out subsequent to the final distillation step, though if desired, the crude alcohol prior to distillation, or after topping, may be thus treated. The treatment with the ion exchange resin does not depend solely upon the alkalinity of this material, for comparable treatment with solid caustic does not effect a comparable sulfur cleanup or ester color improvement. On the other hand, not all anion exchange resins effect this desulfurization, but only those characterized by a high degree of alkalinity. Because of the readily regenerable nature of the resin, which is regenerated by percolating caustic, preferably in alcoholic solution, over spent resin, long life of the sulfur removal agent is assured, at the same time, avoiding the defects of the prior art, as passing inorganic material into the distillation zone.

The present invention and its application will best be understood from the more detailed description hereinafter, wherein reference will be had to the accompanying drawing, which is a schematic representation of a system suitable for carrying out a preferred embodiment of the invention. As the latter resides in the treatment of an alcohol from the hydrogenation step and finds its greatest utility when a sulfactive catalyst is employed, the carbonylation stage and the step of freeing the aldehyde product from the dissolved catalyst is not shown.

Referring now to the drawing, liquid aldehyde product substantially free of dissolved and suspended cobalt, and which may contain as much as 0.005% sulfur is passed to the lower portion of hydrogenator 2 via line 4. Simultaneously, hydrogen is supplied to reactor 2 through line 6 in proportions sufficient to convert the aldehyde product into the corresponding alcohols. The catalyst within reactor 2 is preferably a sulfactive one; an excellent catalyst is one comprising molybdenum sulfide supported on an activated carbon support. Hydrogenator 2 may be operated at pressures of from about 2500–4500 p. s. i. g. and temperatures of from about 400° to 550° F., and a liquid feed rate of about 0.25 to 2 v./v./hr. It is also beneficial to add to the hydrogenation zone up to 1–10% of water, to aid in selectivity to alcohol product.

The products of the hydrogenation reaction are withdrawn overhead through line 10, then passed through cooler 12 into high pressure separator 14, where unreacted hydrogen may be withdrawn overhead through line 16 for further use in the system. Liquid products are withdrawn from separator 14 through line 18 and are passed to still 22 through pressure release valve 20. As pointed out, the crude alcohol product has a comparatively high sulfur content of 10–30 parts per million. If relatively freshly prepared catalyst is employed, the sulfur content may be even higher. This is true even if the aldehyde feed to the hydrogenation zone 2 had a lower sulfur content. In still 22 the low boilers, mostly hydrocarbons boiling below the desired alcohol product are distilled overhead. Thus, when a $C_7$ olefin fraction is the feed to the carbonylation zone, generally the product boiling up to about 340° F. is removed as a heads cut in still 22 and used as fuel blending agent.

The bottoms from this primary distillation are withdrawn through line 26 and passed to alcohol still 28, where product alcohol is removed overhead through line 30 by distillation at atmospheric or reduced pressures. The bottoms from the distillation may be further processed, or used as fuel.

The recovered alcohol, containing excessive quantities of sulfur in solution, is passed to the top of desulfurizing column 32 for percolation therethrough. Column 32 is packed with a strongly basic resin, such as the commercially available "Amberlite IRA-400," manufactured by the Resinous Products Chemical Company, Philadelphia, Pa.; these resins are characterized by a high degree of alkalinity and will be described more particularly as to their compositions hereinafter. Less highly alkaline resins are not suitable, as shown more clearly below. The rate of throughput may be about 1 to 8 v./v./hr., preferably 1 to 5 v./v./hr., and it is preferable to operate at room temperature. For this reason, it may be desirable to cool the effluent from still 28 in cooler 31. It is usually desirable to maintain two columns in parallel, and switch streams so that as one column becomes spent, the flow of alcohol may be switched to the second column and the first regenerated. Regeneration is generally carried out by percolating an aqueous or alcoholic solution of caustic over and through the resin, all in a manner known per se. Alcohol product substantially completely free from sulfur impurities is recovered through line 34.

The high degree of desulfurization obtained may be illustrated by the following specific examples.

A sample of the strongly basic resin, "Amberlite IRA-400" was converted from the chloride to the hydroxide form by passing aqueous caustic through a column of the resin about 3 cm. in diameter and 18 cm. tall. Excess caustic was removed by rinsing with distilled water, which in turn was removed with iso-propanol.

Octyl alcohol samples produced in the semi-commercial 100 B./D. units were percolated through the column of resin at about 1 v./v./hr. Both ester color and mercaptan sulfur were determined prior to and subsequent to the percolation.

|  | Ester Color (Absorption at 447 Mu) | | Mercaptan S (p. p. m.) | |
| --- | --- | --- | --- | --- |
|  | Before Treatment | After Treatment | Before | After |
| Sample A | 0.64 | 0.16 | 15 | 2 |
| Sample B | 0.49 | 0.15 | 12 | 0 |

An ester color of 0.20 or preferably, 0.15 or less, is satisfactory for plasticizing purposes.

The resin was regenerated by passing through the column, in order, 300 cc. of 95% ethanol, 1 liter of 10% aqueous NaOH, 1 liter of distilled water, and 500 cc. of 95% ethanol. Regeneration requirements vary with the amount of sulfur in the alcohol feed, for low sulfur feeds, 10 to 20 or more volumes of alcohol may be treated per volume of resin before regeneration is necessary.

To show that high ester color is directly associated with mercaptan sulfur content, the following data are presented.

| Synthetic mixture of N-heptyl mercaptan in 2-ethyl hexanol. | p. p. m. S Theoretical | p. p. m. RSH Anal. | Ester Color 447 Mu. |
|---|---|---|---|
| Blank | | 0 | 0.03. |
| Sample 1 | 2 | 2 | 0.09. |
| Sample 2 | 5 | 5 | 0.16. |
| Sample 3 | 10 | 9 | 0.38. |
| Synthetic mixture of iso-octyl alcohol and $C_8$ Oxo mercaptan. | | p. p. m. S Added. | Ester Color, 447 Mu. |
| Blank | | 0 | 0.03. |
| Sample 1 | | 3 | 0.15. |
| Sample 2 | | 10 | 0.50. |

Thus, an alcohol whose sulfur content has been lowered to 5 parts per million or less produces an ester with desirable low color characteristics.

That it is not merely an adsorption phenomenon nor merely a neutralization by treatment with a strong base is demonstrated by the following data, wherein iso-octyl alcohol was treated with equal volumes of the following solids for a period of two hours.

Solid:                                            Ester color
None _____ 0.16
Caustic _____ 0.20
Activated carbon _____ 0.11
Resin IRA-400 _____ 0.06
Bauxite _____ 0.19
$Na_3PO_4 \cdot 12H_2O$ _____ 0.19

Only the strongly basic resin showed any significant reduction in the ester color.

In another series of experiments, both acidity and ester color of iso-octyl alcohol were improved greatly by percolation through a highly basic exchange resin. Customary adsorbents had little effect on the alcohol.

| Material | Percolation Rate, v./v./hr. | Acidity, Wt. Percent HAC | Ester Color |
|---|---|---|---|
| None | | 0.020 | 0.17 |
| Silica gel | 1 | | 0.11 |
| Fullers Earth | 2.7 | 0.024 | 0.14 |
| Activated $Al^2O^3$ | 57 | 0.024 | 0.14 |
| Bauxite | 55 | 0.021 | 0.20 |
| Super Filtrol | 58 | 0.025 | 0.22 |
| Resin IRA-400 | 1 | 0.001 | 0.02 |
| Resin IRA-400 | 5 | 0.001 | 0.06 |
| Resin IR-4B | 1 | 0.018 | 0.14 |
| Resin IR-4B | 5 | 0.021 | |

Here again the low ester color obtained by percolation through the highly basic resin contrasts sharply with the product obtained by percolation through customary solid adsorbents. "Resin IR-4B," a modified phenol-formaldehyde polyamine condensate, also manufactured by Rohm and Haas, is a relatively weak base, and is not suitable for the process.

As has been mentioned previously, a strongly basic anion exchange resin is suitable for the treatment of iso-octyl alcohol to produce an alcohol of low ester color. Anion exchange resins are customarily described as amine-type or polyamine-type and may be prepared by reaction of a suitable amine or mixtures of amines with formaldehyde. Or co-polymers of styrene and divinyl benzene, for example, may be nitrated and reduced to form the resins. The present invention is not limited to an anion exchange resin prepared by a particular method. It is important, however, that the resin behave as a strong base, with its hydroxyl ions in solution.

Strongly basic anion exchange resins like "Amberlite IRA-400" are quaternary amine-type exchangers, as described on page 11 and in chapter 4 of "Ion Exchange Resins," by Kunin and Myers, published May 1951, by John Wiley & Sons, Inc., New York. The process of preparing these quaternary amine or ammonium type resins is set forth in U. S. Patent 2,591,573, patented April 1, 1952, to C. H. McBurney of the Rohm & Haas Company. These strongly basic anion exchange resins are typically formed by reacting a tertiary amine with an insoluble, cross-linked copolymer of an aromatic monovinyl hydrocarbon and an aromatic divinyl hydrocarbon, e. g. styrene and divinyl benzene. The products of such a reaction are insoluble, polymeric, quaternary ammonium hydroxides which are strongly basic compared to the condensation product of an amine with an aldehyde or the weakly basic phenol-formaldehyde type exchange resin.

What is claimed is:

1. In a carbonylation process wherein olefins, carbon monoxide and hydrogen are contacted in an initial carbonylation zone with a cobalt carbonylation catalyst under conditions to produce oxygenated reaction products comprising aldehydes and wherein said reaction products are further subjected to a hydrogenation reaction in the presence of a hydrogenation catalyst in a hydrogenation zone to produce an alcohol product having one more carbon atom than said olefin and wherein said alcohol product is contaminated with minor amounts of sulfur-containing impurities, the improvement which comprises contacting said alcohol product with a synthetic highly alkaline ion exchange resin of the cross linked-polymeric quaternary ammonium type.

2. The process of claim 1 wherein said treatment is carried out in the absence of water.

3. The process of claim 1 wherein the sulfur content is reduced to less than about 12 quarts per million.

4. The process of claim 1 wherein said alcohol product is percolated through a bed of said contacting agent at a rate of about 1 to 8 v./v./hr.

5. The process of claim 4 wherein room temperature is maintained within said contacting zone.

6. In the process of preparing iso-octyl phthalates from a heptene fraction wherein said fraction is reacted with carbon monoxide and hydrogen at elevated temperatures and pressures with a cobalt catalyst to form an iso-octyl aldehyde product and said product is hydrogenated over a sulfactive catalyst to produce an iso-octyl alcohol product containing a minor amount of sulfur contaminant, and said alcohol product is esterified with phthalic anhydride, to form iso-octyl phthalate, the improvement which comprises passing said contaminated alcohol product through a bed of a highly alkaline synthetic ion exchange resin of the quaternary ammonium type prior to said esterification reaction, whereby said contaminants are removed and a superior ester product obtained.

7. In a carbonylation process wherein olefins, carbon monoxide and hydrogen are contacted in an initial carbonylation zone with a cobalt carbonylation catalyst under conditions to produce reaction products comprising aldehydes, and wherein said reaction products are further subjected to a hydrogenation reaction in the presence of a sulfactive hydrogenation catalyst to produce an alcohol product having one more carbon atom than said olefin, and wherein said alcohol product is contaminated with minor amounts of sulfur-containing impurities, the improvement which comprises contacting said alcohol product with a highly alkaline base exchange contacting agent of the quaternary amine type.

8. In a carbonylation process wherein olefins, carbon monoxide and hydrogen are contacted in an initial carbonylation zone with a cobalt carbonylation catalyst under conditions to produce reaction products comprising aldehydes, and wherein said reaction products are further subjected to a hydrogenation reaction in the presence of a sulfactive hydrogenation catalyst consisting essentially of molybdenum sulfide supported on activated carbon to produce an alcohol product having one more carbon atom than said olefin, and wherein said alcohol product is contaminated with minor amounts of sulfur-containing impurities, the improvement which comprises contacting said alcohol product with a highly alkaline base exchange contacting agent of the quaternary amine type.

References Cited in the file of this patent

UNITED STATES PATENTS

| | | |
|---|---|---|
| 2,485,485 | Dudley | Oct. 18, 1949 |
| 2,500,913 | Schexnailder | Mar. 14, 1950 |
| 2,525,354 | Hoog et al. | Oct. 10, 1950 |
| 2,544,271 | Liedholm et al. | Mar. 6, 1951 |
| 2,585,816 | Mertzweiller | Feb. 12, 1952 |
| 2,595,786 | Hale et al. | May 6, 1952 |
| 2,628,986 | Wallace et al. | Feb. 17, 1953 |

FOREIGN PATENTS

| | | |
|---|---|---|
| 125,443 | Sweden | July 12, 1949 |